United States Patent [19]
Link

[11] Patent Number: 5,226,506
[45] Date of Patent: Jul. 13, 1993

[54] COLLING-LUBRICATING DEVICE

[76] Inventor: Edmar Link, Hirsauer Str. 8, 7500 Karlsruhe 41, Fed. Rep. of Germany

[21] Appl. No.: 814,587

[22] Filed: Dec. 30, 1991

[30] Foreign Application Priority Data

Jan. 10, 1991 [DE] Fed. Rep. of Germany ... 9112244[U]
Jun. 12, 1991 [EP] European Pat. Off. ......... 91120980.7

[51] Int. Cl.⁵ ............................................. F16N 7/32
[52] U.S. Cl. ................................. 184/6.26; 184/55.1; 239/419; 239/587.2
[58] Field of Search ............... 184/6.14, 6.26, 55.1, 184/55.2; 239/419, 427.3, 427.2, 428, 545, 543, 587.2; 138/120

[56] References Cited
U.S. PATENT DOCUMENTS

| | | | |
|---|---|---|---|
| 2,342,757 | 2/1944 | Roser | 239/587.3 |
| 2,492,526 | 12/1949 | Geibig | 239/587.2 |
| 2,645,277 | 7/1953 | Richter | 239/419 |
| 3,131,869 | 5/1964 | Vega et al. | 184/55.1 |
| 3,478,843 | 11/1969 | Eckardt | 184/6.26 |
| 3,561,680 | 2/1971 | Ott | 239/413 |
| 3,618,709 | 11/1971 | Boelkins | 184/55.1 |
| 3,756,348 | 9/1973 | Iizumi | 184/55.2 |
| 4,390,330 | 6/1983 | Kodama et al. | 184/6.26 |
| 4,919,232 | 4/1990 | Lofton | 184/6.26 |
| 5,042,618 | 8/1991 | Switalski et al. | 184/55.1 |

FOREIGN PATENT DOCUMENTS 2202026  9/1988  United Kingdom ................ 138/120

Primary Examiner—Ira S. Lazarus
Assistant Examiner—Alan B. Cariaso
Attorney, Agent, or Firm—Rogers & Killeen

[57] ABSTRACT

A cooling-lubricating device which is suitable especially to cool and lubricate cutting tools in machine tools and provides a gas/liquid stream which is sprayed on the location to be machined (50) through mixer heads (3) which have one outlet aperture (9') each, comprises at least two mixer heads to produce a mixture of gas and liquid. The mixture is supplied through flexible hose lines (11, 16) which can be bent individually into a desired inherently stable configuration so as to direct the mixer heads (3) with their outlet apertures (9') at the machining location (50).

17 Claims, 5 Drawing Sheets

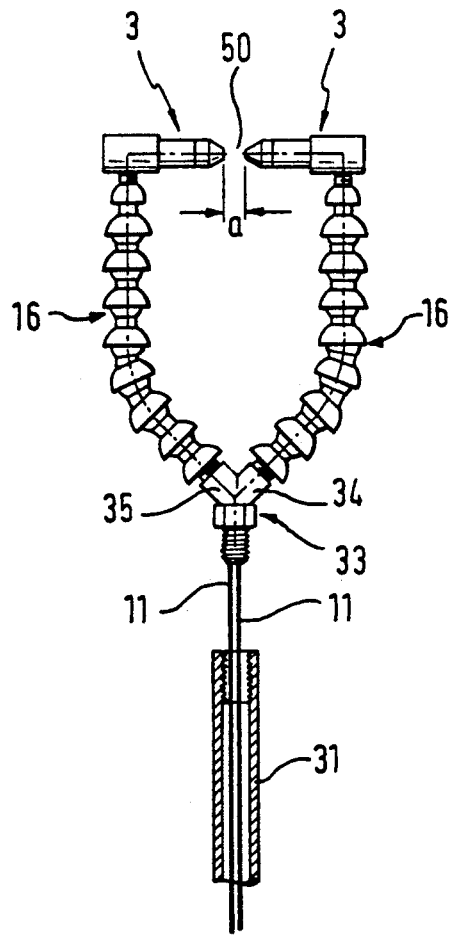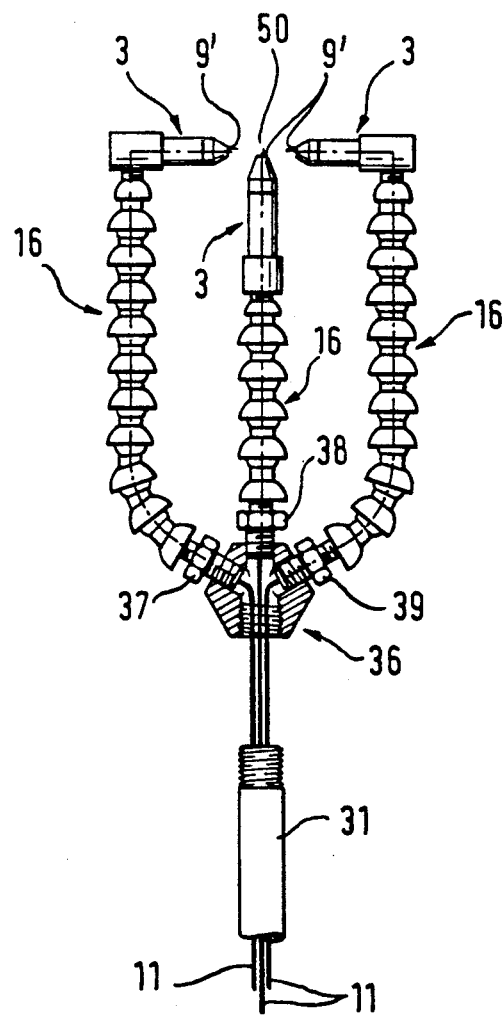

COLLING-LUBRICATING DEVICE

The instant invention relates to a cooling-lubricating device, especially for cutting tools in machine tools.

In a known cooling-lubricating device (DE-OS 19 28 573) the mixer comprises a central liquid chamber connected to the liquid pipe and an annular chamber surrounding the central chamber and being connected to the gas conduit. The outlet aperture of the liquid chamber is surrounded by an annular nozzle of the gas conduit. The annular gas stream exiting from the annular nozzle sucks liquid through the outlet aperture into the surroundings where is generates a spray.

In another known cooling-lubricating device (DE-OS 19 49 315) air is propelled to high speed by a venturi tube and sucks lubricating liquid through a sintered filter into the widened area of a nozzle opening in the direction of the lubricating location. In this case, too, the lubricating liquid is vaporized to form a spray prior to reaching the lubricating location.

A proposal was made to arrange a mixing chamber upstream of the outlet aperture and to feed liquid and gas under pressure into that mixing chamber in order to permit well aimed cooling and lubricating of the machining location and avoid the undesired admixing of liquid droplets to the ambient air as well as the formation and dripping of liquid drops at the outlet aperture. In that case (DE 37 43 968 C1) it was thought of only one mixing device directed non-adjustably towards the machining location.

It is an object of the invention to improve the cooling-lubrication still further at the machining location and, in doing that, achieve a fine dosage of the cooling-lubricating medium which is precisely adjustable to the respective demand at the place of lubrication, involving minimum consumption of lubricant.

Claim 1 serves to meet that object.

The cooling-lubricating device according to the invention is suitable for spraying even very small quantities of liquid precisely at the desired location or locations at the place to be cooled or lubricated. At the same time, the amounts of liquid conveyed may be adjustable differently in response to the particular cooling-lubricating task, when a plurality of mixer heads are utilized simultaneously. That provides cooling-lubrication of hitherto unknown quality, even when the parts to be finished are very small, using up a minimum quantity of lubricant.

With a cooling-lubricating device according to the invention the gas/liquid jet is formed in a pressurized mixing chamber in which the weak, finely adjusted liquid stream is divided into small droplets. Intimately mixed with the gas stream, the liquid is blown out of the mixing chambers in at least two bundled jets aimed directly at the machining location. The small droplets follow the motion of the gas stream and thus can reach and wet areas which are hidden from the straight view of the outlet aperture of the mouthpiece. That is necessary because usually the cutting tool covers the surfaces to be cooled and lubricated. At the same time, the tool produces new surfaces by cutting which are hidden to the mouthpiece and which must be wetted by the liquid for cooling and lubricating purposes immediately upon originating. Excellent cooling and lubricating are achieved with small volumes of liquid, both the cooling and lubricating being intensified considerably due to the higher heat dissipating capacity and by the greater amount of coolant-lubricant which is transported to the machining location per unit time by means of the two or more jets, as compared to a device which includes only one mixing means.

The apparatus according to the invention, for instance, is suitable also for intimately mixing liquid additives and gas streams in medical applications. In such cases the mixed streams may be used for such purposes as inhalation, disinfection, and to produce protective or cooling coatings on burns.

A cooling-lubricating device according to the invention has the following further advantages.

The higher pressure of the liquid as compared to the gas (such as compressed air or nitrogen) in the mixing chamber permits both vehicles to be mixed at a pressure above atmospheric pressure. The mixed jet thus may be well focussed on the area to be cooled or lubricated. With the particularly advantageous modification with which each mixing chamber is surrounded by an annular chamber connected to the gas conduit and opening into the outlet aperture the exiting mixed jet is wrapped by a gaseous enveloping stream which keeps the mixed jet in compact condition because there are minor velocity differences and thus little vortex formation at the boundary between the mixed jet and the enveloping stream. Therefore, the enveloping stream guides the droplets contained in the mixed jet pointedly to the area to be cooled or lubricated, preventing the highly undesired admixing of liquid droplets to the ambient air. Moreover, the enveloping stream prevents the formation of liquid drops at the exit from the mixing chamber, which drops might fall down and cause contamination.

The compact mixed jets likewise make it possible to cool and lubricate the tool if boring or drilling, reaming or honing is performed in deep or tight holes.

The cooling-lubricating device according to the invention is capable of functioning in any desired position. It need not be mounted in any particular position with respect to the vertical.

The dimensions of each mixer, including the mixing chamber and, if desired, the annular nozzle, can be very small. This and, above all, the possibility of guiding the small amount of liquid needed for a compact mixed jet across a relatively great distance to the place to be cooled or lubricated highly favors the application of the cooling-lubricating device according to the invention with automatic machine tools which operate in programmed sequence with a plurality of tools to be cooled and/or lubricated individually. Use in such machines also benefits from the fact that the liquid and gas line leading to the mixer may have a relatively great length because due to the higher pressure of the liquid in the reservoir over the gas in the mixing chamber, this being a direct consequence of the pressure loss of the gas in the gas conduit, the liquid can be conveyed even across greater distances.

The simple coupling of the pressures of gas and liquid in the reservoir permits simple adjustment of the media flows and of the mixing ratios by means of valves, such as needle valves, without the need for complicated pressure controls and liquid pumps.

The possibility of admixing various liquid streams to the gas stream has the advantage that particularly well suited liquids for cooling and lubricating can be supplied separately. Thus it is unnecessary to use emulsions which may become unmixed and spoilt if stored for longer periods of time.

The invention will be described further, by way of example, with reference to the accompanying drawings, in which.

Figure 1:
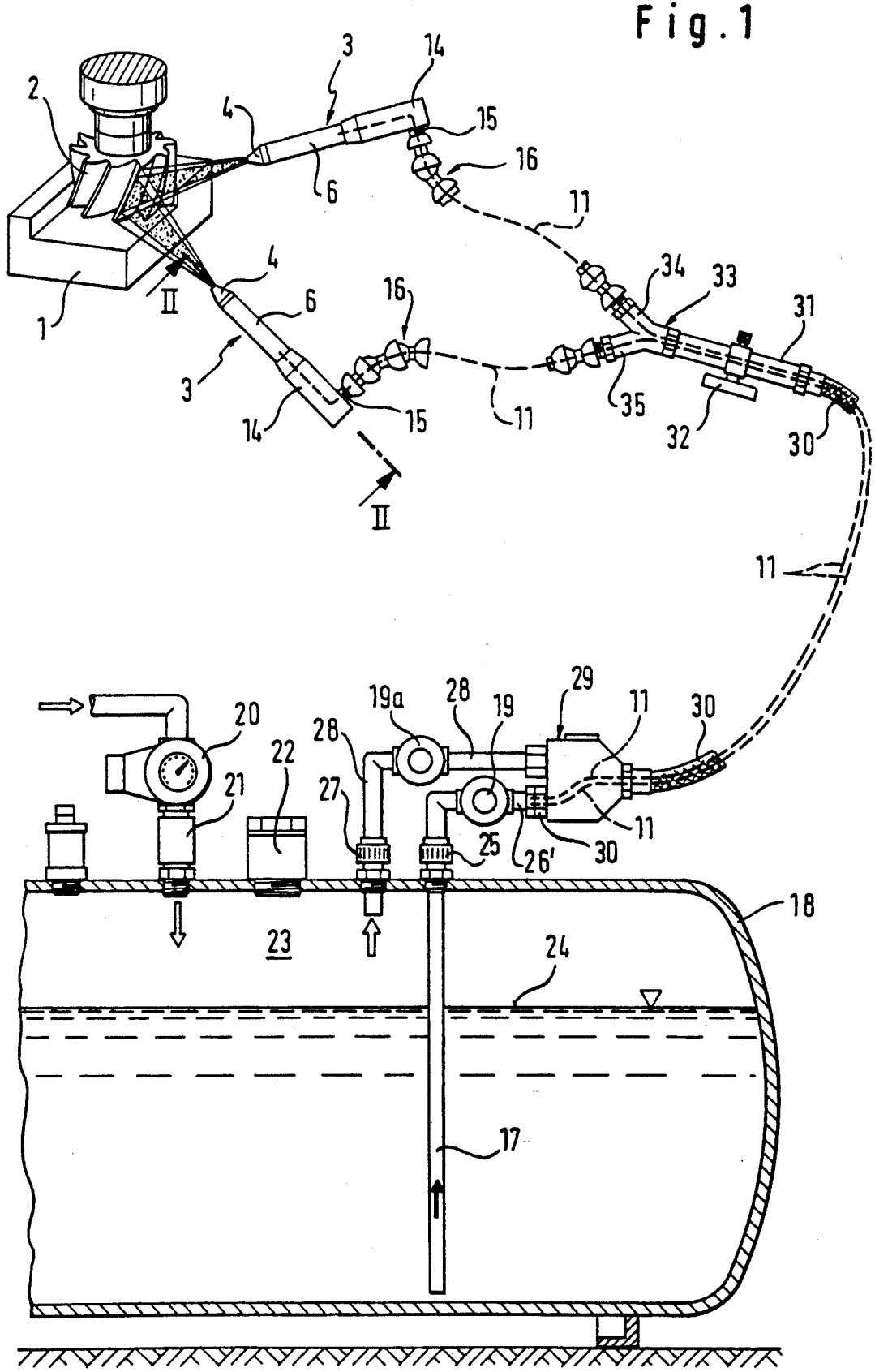
FIG. 1 is an overall view of a cooling-lubricating device according to the invention, including a reservoir for cooling-lubricating liquid and the machining location with the workpiece and the tool as well as two mixers according to the invention.
Figure 2:
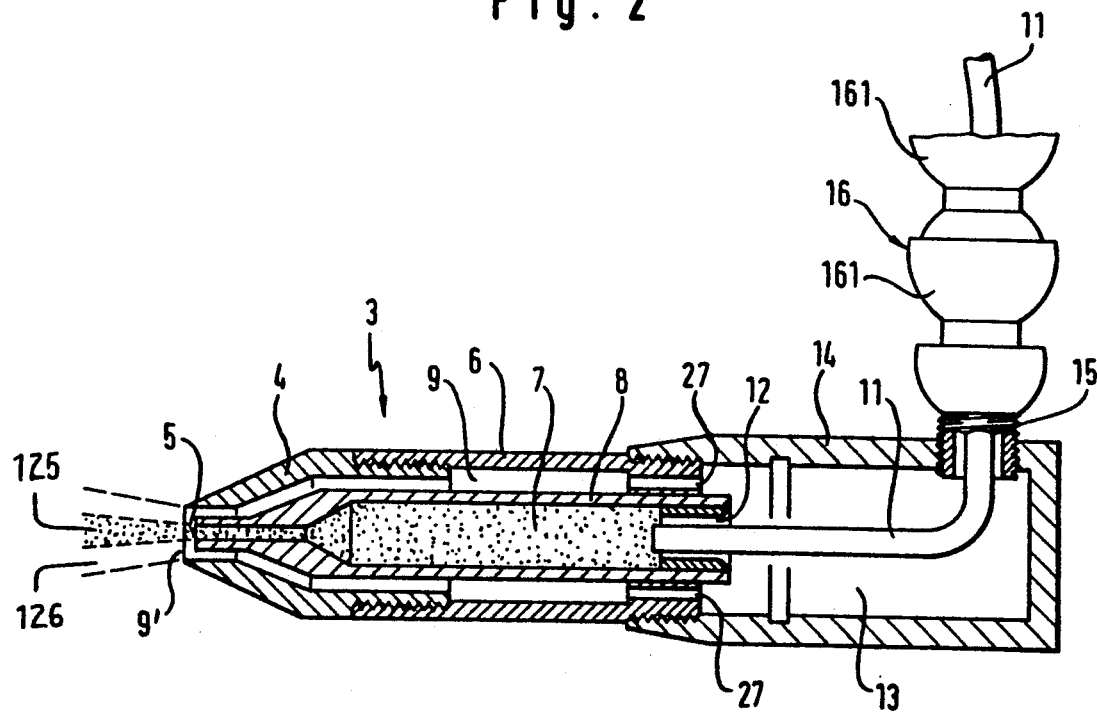
FIG. 2 is a section along line II—II of FIG. 1 through one of the two mixers shown in FIG. 1, including further details.
Figure 5:
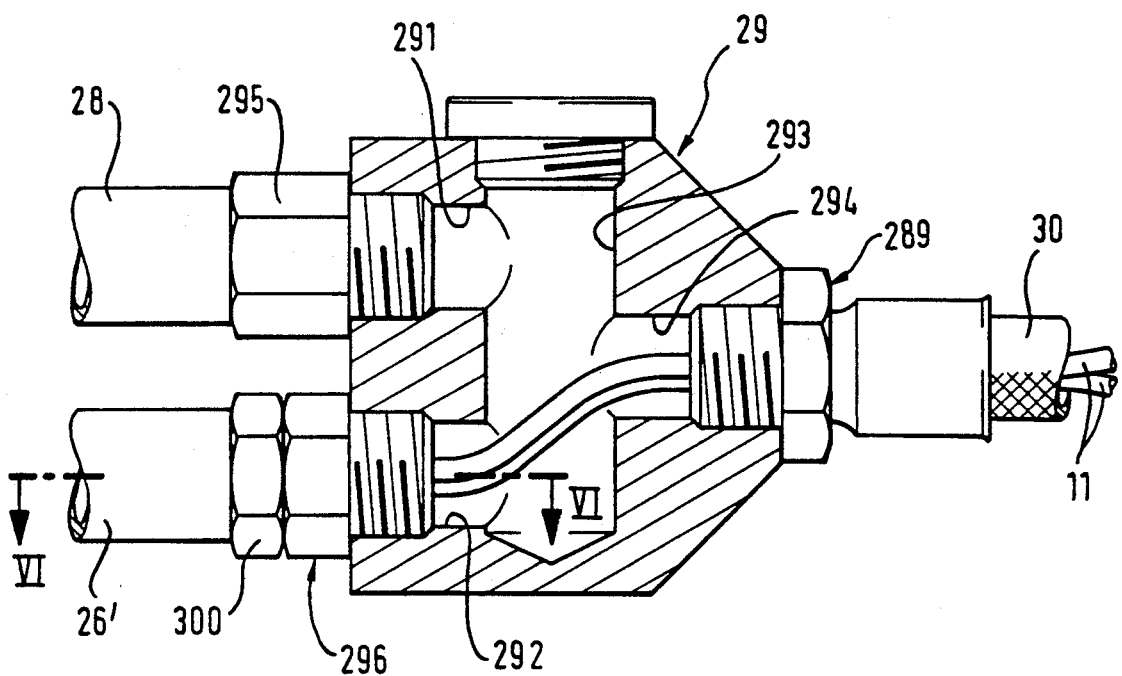
Figure 6:
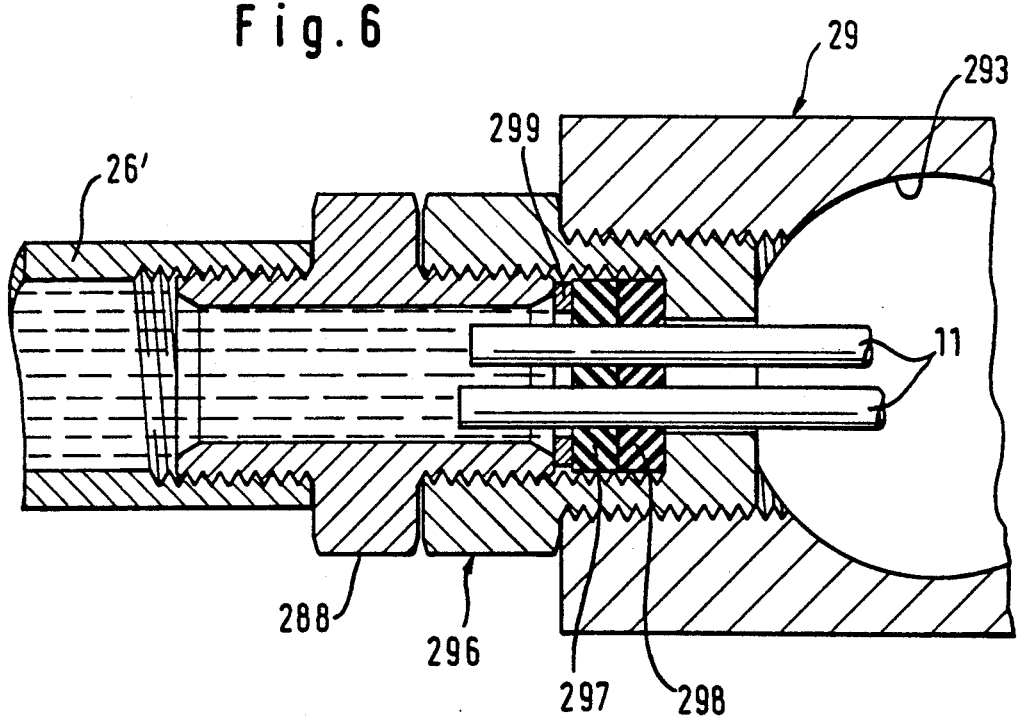
Figure 7:
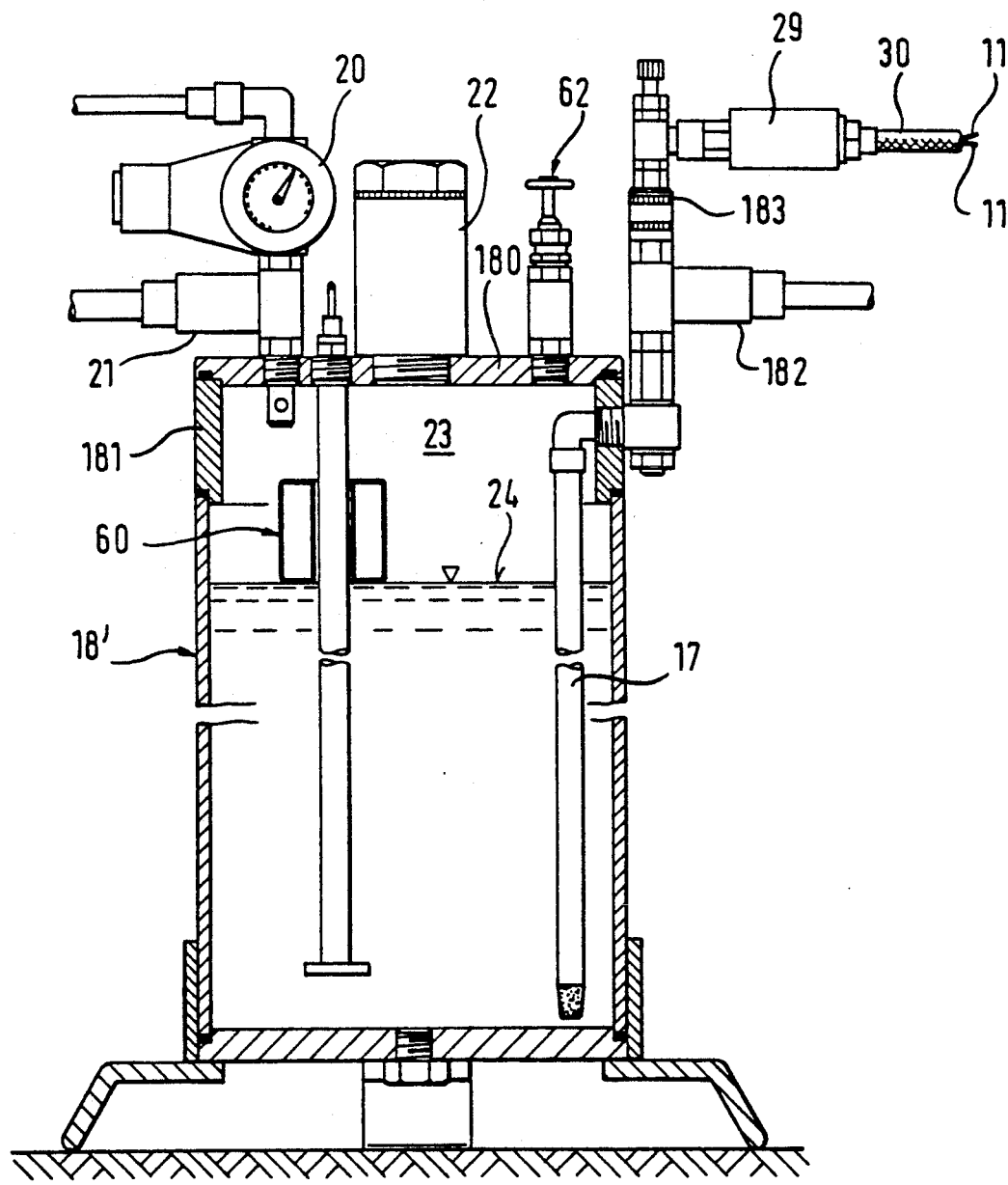

FIGS. 3 and 4 present embodiments of cooling-lubricating devices according to the invention with two and three mixers according to the invention, each built as shown in FIGS. 1 and 2;

FIG. 5 is a section through a separator member for connecting the mixer(s) according to FIG. 1 to a gas and liquid reservoir;

FIG. 6 is a section along line VI—VI of FIG. 5 through the liquid seal of the separator member shown in FIG. 5, on an enlarged scale;

FIG. 7 is a sectional elevation through the part facing the reservoir of a modified cooling-lubricating device according to the invention.

In FIGS. 1 to 3 a workpiece made of a material which is difficult to machine is marked by reference numeral 1 and a milling tool of an NC machine tool is marked by reference numeral 2.

A mixer head 3 of a cooling-lubricating device contains an outer mouthpiece 4 tapering conically into an annular outlet aperture 9' and being threaded into an end of an outer tube 6, and an inner tube 8 defining a mixing chamber 7 and likewise tapering conically into an outlet aperture 5, for example a circular one, disposed approximately in the same plane as the annular outlet aperture 9'. An annular chamber 9 is defined between the outer tube 6 and the inner tube 8.

The mixing chamber 7 communicates through an annular nozzle 10 shown in detail in FIG. 2 with a flexible liquid conduit 11 in the form of a capillary hose and through the annular aperture 12 of the annular nozzle 10 with a gas space 13 which is formed in a connecting sleeve 14 threaded on the outer tube 6 and which communicates through a plug 15 with a flexible gas conduit 16. The liquid conduit 11 passes through the gas conduit 16 and through the plug 15 directly into the annular nozzle 10. Consequently gas introduced under pressure through the gas conduit 16 into the gas space 13 and on through the bore 12 into the mixing chamber 7 can mix with the liquid introduced directly by way of the liquid conduit 11 through the annular nozzle 10 into the mixing chamber 7. The gas space 13 additionally communicates through bore 27 with the annular chamber 9 which thus receives pressurized gas.

In its hollow interior, the flexible gas conduit 16 loosely contains the capillary hose 11 which likewise is flexible and serves for conveying the liquid. The resulting hose arrangement 11, 16 on the whole is flexible in such manner that it may be bent into inherently stable positions, as desired, so as to locate the mixer heads 3 at desired spacings and in desired angular positions with respect to the machining location.

As shown in FIGS. 1 to 4, the flexible gas conduit 16 may be consist of part-spherical, rigid elements 161 made of plastics which are joined together in articulated fashion and in gas-tight manner, forming a hollow passage for the flexible capillary hose 11 for the transportation of liquid. The gas flows in the remaining gas-tight hollow space inside the elements 161. The gas conduit instead may be embodied by a flexible pipe, e.g. of copper or steel adapted to be bent into a desired inherently stable shape and likewise containing the flexible capillary hose 11 to convey the liquid.

In the embodiment illustrated, the capillary hose 11 is made of plastics, preferably PTFE (polytetrafluoroethylene, tradename: Teflon). It can be made reproducible with very small diameters so that fine liquid dosing can be effected reproducibly. For instance, inner diameters of the capillary hose of 0.3; 0.35; 0.45; 0.7; and 1.0 mm can be realized at high accuracy. That permits realization of conveying capacities down to 5 ml/h (milliliters per hour), in other words very small), metered liquid quantities which could not be realized so far with conventional needle valves—the minimum quantities were something like 60 ml/h. This involves very low consumption of liquid, a circumstance which is highly desirable for reasons of protecting the environment and because of the (high) cost of the liquids used (vegetable-base oils).

A liquid reservoir 18 can be filled with cooling-lubricating liquid through a fill screw 22 including return preventing means. The liquid is supplied through a riser 17 from the bottom of the liquid reservoir 18, passing through a needle valve 19 by means of which the flow of liquid is controllable. The liquid is pressurized by the pressure of the gas (air) coming from a pressure source at a conventional supply pressure of between 1 and 8 bars and being introduced into a gas space 23 above the liquid level 24 of the liquid in the reservoir 18, at a pressure between 0.5 and 7 bars, through a pressure reducing valve 20, which permits sensitive pressure adjustment, and through a 3/2-way valve 21, which may be operable manually or may be a magnetic or pneumatic valve.

The liquid reaches the needle valve 19 through a gas-tight plug-in coupling 25 of conventional type and a pipe elbow 26.

Gas (air) is withdrawn from the gas space 23 through another gas-tight plug-in coupling 27 and a pipe elbow 28 incorporating a needle valve 19a for control of the gas quantity.

Gas and liquid are fed into a separator member 29 shown in detail in FIGS. 5 and 6. The separator member 29 has two inlet bores 291 and 292 interconnected by a transverse bore 293 which is closed at both ends. An outlet bore 294 branches off from the transverse bore 293. The pipe elbow 28 through which the gas is passed is threaded into the one inlet bore 291 by way of a conventional sealing screw 295. The pipe end 26' through which liquid flows and which is located downstream of the needle valve 19 is threaded into the other inlet bore 292 by way of a stuffing box packing 296, including two sealing washers 297, 298 and a contact pressure washer 299. While the contact pressure washer has only one big bore to permit passage of one or more capillary hoses 11, the sealing washers are formed with a number of through bores corresponding to the number of capillary hoses. In the instant case, two through bores are provided for two capillary hoses 11, 11 which have their open ends, facing the reservoir, extend into an intermediate screw 288 filled with liquid. This prevents the capillary hoses from becoming twisted by being turned along when the contact pressure washer 299 is rotated as the sealing screw is tightened. The capillary hoses then extend through the transverse bore 293, the outlet bore 294, and a sealing screw 289 into a manifold formed by a flexible hose 30 in which gas likewise being passed through the outlet bore 294 and the sealing screw 289 out of the separator member 29 flows around the capillary hoses. The separator member 29 thus makes sure that liquid and gas are passed on separately in the manifold 30. The separator member 29 already divides the liquid stream into the desired number of subsidiary branch flows, two in the instant case in the two capillary hoses 11. Instead of two capillary hoses 11, of course, three or more such hoses may be provided for conveying liquid, or only one, depending on the number of mixer heads required to accomplish the lubricating task. (One capillary hose 11 belongs to each mixer head 3.)

The manifold 30 is of a length sufficient to convey gas and liquid separately into the vicinity of the cooling and lubricating location, namely the place of work of the milling tool 2 of the machine tool. There the manifold 30 opens into a rigid mouthpiece 31 provided with a magnetic fixture 32 for retention at the machine tool and with a distributor member 33 at the downstream end being bifurcated to have two fork ends 34 and 35 (FIG. 1). A capillary hose 11 is passed out of each fork end and introduced into a hose arrangement 11, 16 described above and formed in that one of the gas conduits 16 constituted as specified above is connected to each fork end by means of a sealing screw.

The distributor member thus divides the gas and liquid streams for allocation to the respective mixer heads 3, with the division of the liquid stream having taken place already in the separator member 29.

Thus pressurized, divided gas and liquid streams are passed on to each mouthpiece 4 and are directed by the outlet aperture 5 at the machining location in a jet having the configuration of a cone-shaped shell. At the same time, the gaseous enveloping stream 126 which exits through the annular outlet aperture 9' and surrounds the mixed jet 125 ensures that no liquid drops form at the exit of the mixing chamber 7 from which they might fall down and cause contamination.

It is also possible to have a plurality of liquid conduits 11 open into one mixing chamber 7. That permits an emulsion to be formed from various liquids in the mixing chamber 7 only, in other words just before the machining location. Thus there is no need for keeping ready and storing in a common reservoir 18 such emulsions which often spoil quickly. The plurality of liquid conduits in that event lead to separate reservoirs each.

The embodiment according to FIG. 3 shows two mixer heads 3 at the ends of a flexible, inherently stably bendable hose arrangement 11, 16 each, branching off each from one of the two fork ends 34, 35 of the distributor member 33. The mixer heads 3 are aligned in diametrically opposed directions at a predetermined spacing a which leaves the desired room for the machining location 50 (point of attack of the tool at the workpiece) between the outlet apertures 9'.

In the embodiment according to FIG. 4 three mixer heads branch off from a distributor member 36 having three openings for connection in fluid communication with the corresponding gas and liquid branches in the associated hose arrangement 11, 16 through threaded plugs 37, 38, 39.

As in FIGS. 1 and 3, the two outer mixer heads 3 are arranged at right angles with respect to the ends of the corresponding hose arrangement 11, 16. To accomplish that, the end of the respective inwardly located capillary hose 11 must be bent at a right angle. That has the advantage that the capillary hose cannot retract easily from the annular nozzle 10 of the mixer head 3, thereby becoming displaced axially with respect to the outer gas conduit 16, which would be undesirable in consideration of the quality of mixing.

The embodiment according to FIG. 7 shows a reservoir 18' of cylindrical design made in actual practice and comprising the fixtures and connecting pieces also provided in the embodiment according to FIG. 1 and, therefore, designated by the same reference numerals without being described once more.

In addition there is a float-type filling level pickup 60 of conventional structure and a pressure relief valve 62 which is adjustable to a blow-off pressure between 4 and 8 bars. The fixtures and connecting pieces already mentioned are mounted in a cover 180 of the reservoir 18'. However, there is only limited space due to the cylindrical shape of the reservoir. For this reason a connecting ring 181 is mounted tightly on the open end of the cylindrical reservoir 18' and the upper end of this ring is closed by the cover 180. The liquid pressed upwardly through the riser 17 is passed to the outside through the connecting ring 181 by way of a 2/2-way valve 182 which may be embodied by a magnetic valve, a pneumatic valve, or a manually operated valve, and a gas-tight plug-in coupling 183, and thus is fed to the separator member 29 (not shown). In the same manner, the gas is conducted out of the gas space 23 through the connecting ring 181 to the separator member 29 (not shown).

Where the arrangement comprises a plurality of mixer heads 3 the simple use of capillary hoses 11 having different inner diameters makes it possible to bring liquid quantities metered to different values to different places of the lubricating location, as may be required for the particular lubricating job.

What is claimed is:

1. A cooling-lubricating device for providing a gas/liquid mixture which is sprayed upon a location to be cooled, comprising:
    plural mixer heads (3), each with one outlet aperture (9') for spraying a mixed gas/liquid jet at the location to be cooled;
    a liquid reservoir (18) communicating with each mixer head (3) through one of a plurality of separate liquid conduits (11); and
    a source of pressurized gas communicating with a gas space (23) above the liquid level (24) in the reservoir and from that space through a separator (29) communicating with said reservoir (18) and a common flexible gas conduit (30) connected to said separator (29), and separate gas conduits (16) to each mixer head (3).
    wherein all of said plurality of said liquid conduits (11) are internal to said common gas conduit (30) throughout the length of said common gas conduit (30) to form a hose arrangement (11, 30, 16) of such flexibility that each mixer head (3) can be directed individually at the location to be cooled.

2. The device as claimed in claim 1, characterized in that each liquid conduit (11) is embodied by a capillary hose made of plastics and having inner diameters in the range of between 0.1 and 2 mm, preferably between 0.3 and 1 mm.

3. The device as claimed in claim 2, characterized in that the capillary hose is made of polytetrafluoroethylene plastics.

4. The device as claimed in claim 1, characterized in that the or each gas conduit (16) consists of a bendable, inherently stiff hose made of rigid plastics comprising part-spherical, mutually pivotable elements.

5. The device as claimed in claim 1, characterized in that each gas conduit (16) is made of a metal tube of a metal which is bendable plastically by hand.

6. The device as claimed in claim 1, characterized in that valves (19, 20, 21) are provided for separate adjustment of the undivided flows of gas and liquid.

7. The device as claimed in claim 1, characterized in that the flexible liquid conduit (11) communicates directly with a mixing chamber (7) in the mixer head (3) while the flexible gas conduit (16) communicates indirectly with the mixing chamber (7) through a gas space (13) and a nozzle (12).

8. The device as claimed in claim 6, characterized in that the nozzle (12) is designed as a ring nozzle surrounding the end of the liquid conduit (11) which opens directly into the mixing chamber (7).

9. The device as claimed in claim 2, characterized in that each gas conduit (16) consists of a bendable, inherently stiff hose made of rigid plastics comprising part-spherical, mutually pivotable elements.

10. The device as claimed in claim 2, characterized in that each gas conduit (16) is made of a metal tube of a metal which is bendable by hand.

11. The device as claimed in claim 2, characterized in that valves (19, 20, 21) are provided for separate adjustment of the undivided flows of gas and liquid.

12. The device as claimed in claim 2, characterized in that the flexible liquid conduit (11) communicates directly with a mixing chamber (7) in the mixer head (3) while the flexible gas conduit (16) communicates indirectly with the mixing chamber (7) through a gas space (13) and a nozzle (12).

13. A system for delivering a liquid mist from each of plural nozzles that are connected to a gas-pressurized reservoir for the liquid comprising:

a first flexible tube for conveying pressurized gas in the reservoir from a separator connected to the reservoir to a nozzle assembly remote from the reservoir;

said nozzle assembly having plural nozzles, each for forming a liquid mist from the gas and the liquid; and a second flexible tube for each of said plural nozzles for conveying the liquid from said reservoir to said nozzle assembly, each said second tube being inside said first tube throughout the length of said first tube, whereby each of said plural nozzles may be separately directed to deliver a liquid mist.

14. The system of claim 13 wherein said nozzle assembly comprises a fork member and at least three said nozzles.

15. The system of claim 13 wherein each said second flexible tube has an inner diameter of one millimeter or less.

16. The system of claim 13 wherein each of said plural nozzles comprises a mixing chamber for atomizing a liquid before discharge therefrom and an annular gas chamber for providing an enveloping gas stream for surrounding the atomized liquid upon discharge.

17. The device of claim 2 wherein said mixer head (3) comprises a mixing chamber (7) for atomizing a liquid before discharge therefrom and an annular gas chamber (9) for delivering an enveloping gas stream (126) surrounding the atomized liquid (125).

* * * * *